Figure 1:
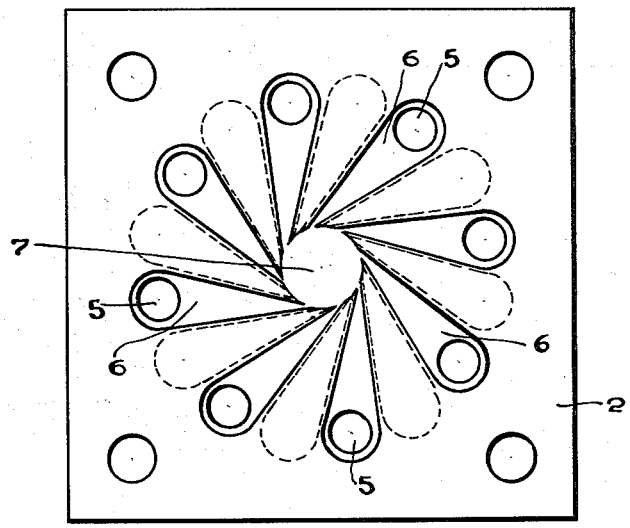

May 18, 1937.  G. LYNN ET AL  2,080,616

PRECIPITATED FINELY DIVIDED CALCIUM CARBONATE

Filed March 17, 1933

Inventors
GEORGE LYNN and
EDWARD M. ALLEN

By Bradley & Bee
Attorneys

Patented May 18, 1937

2,080,616

UNITED STATES PATENT OFFICE 2,080,616

PRECIPITATED FINELY DIVIDED CALCIUM CARBONATE

George Lynn, Wadsworth, and Edward M. Allen, Barberton, Ohio, assignors to Pittsburgh Plate Glass Company, a corporation of Pennsylvania Application March 17, 1933, Serial No. 661,342

2 Claims. (Cl. 23—66)

This invention relates to methods of producing finely divided calcium carbonate by precipitation from soluble calcium salts; and by grinding either natural or precipitated calcium carbonate. Calcium carbonate (whiting) in a finely divided state is used extensively in the arts as a filler for rubber, paint, putty, dentifrices, paper making, etc., and its value as such depends largely upon the smallness of its particles.

Our method is especially suited for application in conjunction with an ammonia-soda plant where large quantities of waste calcium chloride liquor (ammonia distiller liquors) are available. When this liquor (or a solution of a soluble calcium salt) is treated at room temperature with a solution of a soluble carbonate, extremely fine calcium carbonate can be made to precipitate, the mixture setting up to a very stiff jelly. However, the gel is not stable due to the greater solubility of the finer particles which recrystallize, thus forming a crystalline precipitate which rapidly settles from solution. If this reaction is effected at the boiling point instead of at room temperature, this process of recrystallization is greatly accelerated, in fact the gel may never form. This recrystallization may be prevented by the presence of an organic substance such as glue, gelatin and the like which, however, tends to form a hard horny product on drying. By our improved process we accomplish the same result without this objectional feature as hereinafter disclosed.

Our method consists in agitating this fine precipitate before it has had a chance to recrystallize with an inorganic material (such as caustic soda) which will produce a high pH in the reaction liquor. Under these conditions we find the gel will remain stable practically indefinitely. We believe that under these conditions the hydroxyl ions are very strongly adsorbed on the precipitate, and that the solubility of the calcium carbonate is also decreased. These conclusions seem to be substantiated by the fact that when the calcium chloride is originally neutral, the clear liquor from the reaction has a pH of less than seven. Even when small amounts of caustic, (up to two percent of the $CaCO_3$ by weight) are added, the clear liquor from the mixture had a pH of not greater than seven, or stated differently, was slightly acid. We have found that the best conditions for the mixture to remain very finely divided and to maintain its jelly-like properties, are that the pH of the clear liquor be held at a value in the range 9.5 to 11.5, this being determined by centrifuging out the solids and measuring the pH of the clear liquor. With the pH value as just indicated the liquor will be alkaline to a phenolphthalein indicator. With lower pH values than this, the tendency to recrystallize, while lessened, may not be entirely suppressed. With higher values, excess alkali is required which is also more difficult to remove. By maintaining lower values than 9.5 to 11.5, and controlling the conditions of time, temperature and degree of agitation, more or less controlled recrystallization can be attained, which is a valuable feature of this invention.

Figure 2:
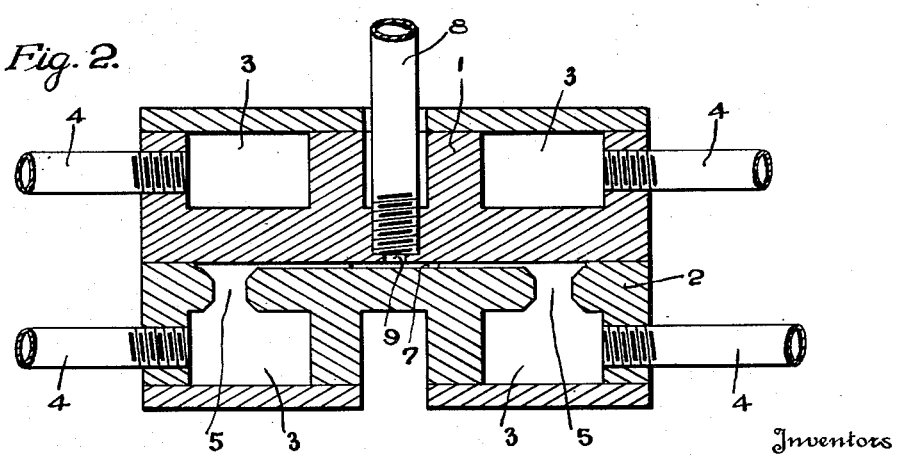

In the drawing, Fig. 1 is a plan view of one part of a mixing device that may be advantageously employed in practicing our invention, and Fig. 2 is a cross sectional view of the assembled device.

In the practice of this invention, it is desirable to mix rapidly and intimately approximately stoichiometric proportions of a soluble calcium salt and of a soluble carbonate and maintain a pH at the value specified, immediately subsequent to the mixing. A convenient way of accomplishing such objective is to have the source supplying hydroxyl ions in one of the solutions being mixed. Any convenient form of apparatus which fulfills these conditions may be used. Depending on the conditions of mixing, it may be necessary to continue the agitation for some time after the initial mixing.

As an example, waste distiller-liquor containing about 133 grams per liter of $CaCl_2$ and 45 grams per liter of NaCl as an impurity, and ash-liquor containing approximately 127 grams per liter of $Na_2CO_3$ and eight grams per liter of NaOH are forced under pressure through a rapid mixer, such as shown in the drawing.

The mixing device includes two similarly formed plates 1 and 2, each being provided with a circular chamber 3 having two inlet conduits 4 connected thereto at diametrically opposite points. Each plate is likewise provided with eight openings 5 which communicate with the chamber 3 and with tapered passages or jets 6 formed in the face of the plate. These jets are formed in such spaced relation on each plate as to interfit when the plates are secured together, as indicated in Fig. 1. The jets all discharge into a mixing chamber 7 which is connected to a tube 8, screwed into the plate 1, by means of an opening 9 centrally located in such plate.

One of the solutions is introduced into the chamber 3 of plate 1 by means of the conduits 4 and the other solution is correspondingly directed into the chamber 3 of the plate 2. The solutions are then forced into the mixing chamber 7 through the jets 6. It will be noted that the jets are so formed that the liquids enter the mixing chamber tangentially causing a swirling motion which promotes rapid mixing. The mixture is extruded through the tube as a jelly-like rod which, if undisturbed, becomes very curdy and does not remain fine. However, if such material is discharged into a suitable mixing vessel and rapidly agitated for a few minutes, it goes through a transition stage, becoming more fluid so as to resemble muscilage in appearance. This material is very stable and will not settle from solution. Contrary to expectations, insurmountable difficulty in filtering, due to the smallness of the particles is not encountered, but the solids can be fairly readily separated from the solution either in a filter press or on a rotary filter. This may be due to the filtering medium adsorbing an ionic charge similar to that on the particles and the latter being held back by electrical repulsion. While we believe the adsorbed ionic charge is largely responsible for the unexpected results, the soundness of this supposition in no way controls the value of our invention.

Similarly we have found that by subjecting limestone or precipitated calcium carbonate, such as that obtained from the chemical caustic process, to attrition in a medium with a high pH, the particles as they are broken down to smaller sizes do not recrystallize, apparently for the same reasons as above designated. The medium may consist of any alkaline solution, such as caustic soda solution, the pH of which is maintained from about 9.5 to 11.5. Without the high pH we have actually seen larger particles after ballmilling than before.

What we claim is:

1. A process of forming finely divided calcium carbonate by precipitation which consists in bringing together with agitation a solution of a soluble calcium salt and one of a soluble carbonate and maintaining a pH of 9.5 to 11.5.

2. A process of obtaining finely divided calcium carbonate which comprises dispersing finely divided calcium carbonate in an alkaline solution while controlling the alkalinity of the solution to maintain a pH value of 9.5 to 11.5.

GEORGE LYNN.
E. MERLE ALLEN.